United States Patent [19]

Noakes et al.

[11] 4,397,772

[45] Aug. 9, 1983

[54] CATALYST SUPPORTS AND FLUID TREATMENT DEVICES

[75] Inventors: Michael L. Noakes, Reading; James A. Cairns, Wantage, both of England

[73] Assignee: United Kingdom Atomic Energy Authority, London, England

[21] Appl. No.: 215,256

[22] Filed: Dec. 11, 1980

Related U.S. Application Data

[63] Continuation of Ser. No. 124,821, Feb. 26, 1980, abandoned, which is a continuation of Ser. No. 916,561, Jun. 19, 1978, abandoned.

[30] Foreign Application Priority Data

Jun. 20, 1977 [GB] United Kingdom ............... 25746/77

[51] Int. Cl.$^3$ .......................... F01N 3/28; B01J 8/00; B01D 53/36
[52] U.S. Cl. .................... 252/477 R; 422/177; 422/211; 422/222; 422/312; 423/213.2; 423/213.5; 423/245; 423/392
[58] Field of Search .................. 423/212, 213.2, 213.5, 423/245, 392; 252/477 R; 261/94, 95; 422/177, 211, 222, 312

[56] References Cited

U.S. PATENT DOCUMENTS

| | | | |
|---|---|---|---|
| 2,332,110 | 10/1943 | Podbielniak | 261/94 |
| 2,526,667 | 10/1950 | Guyer | 252/477 X |
| 2,801,906 | 8/1957 | Bratton | 252/477 |
| 3,391,910 | 7/1968 | Prahl | 261/94 |
| 3,662,783 | 1/1968 | Leak | 252/477 |
| 4,096,095 | 6/1978 | Cairns | 252/477 |
| 4,289,657 | 9/1981 | Nelson | 423/212 X |

FOREIGN PATENT DOCUMENTS 425424 2/1926 Fed. Rep. of Germany ... 261/94 X

Primary Examiner—Earl C. Thomas
Attorney, Agent, or Firm—William R. Hinds

[57] ABSTRACT

A device for treating a fluid, in particular a supported catalyst for motor vehicle exhaust gas purification. The device comprises one or more short helically wound lengths of wire at least a surface of which comprises a solid surface coating for interaction with the fluid. For catalysis the coating is a catalytically active material.

18 Claims, 8 Drawing Figures

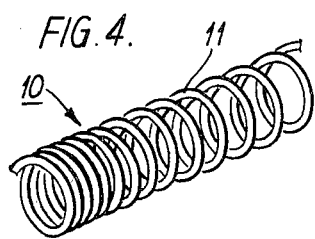
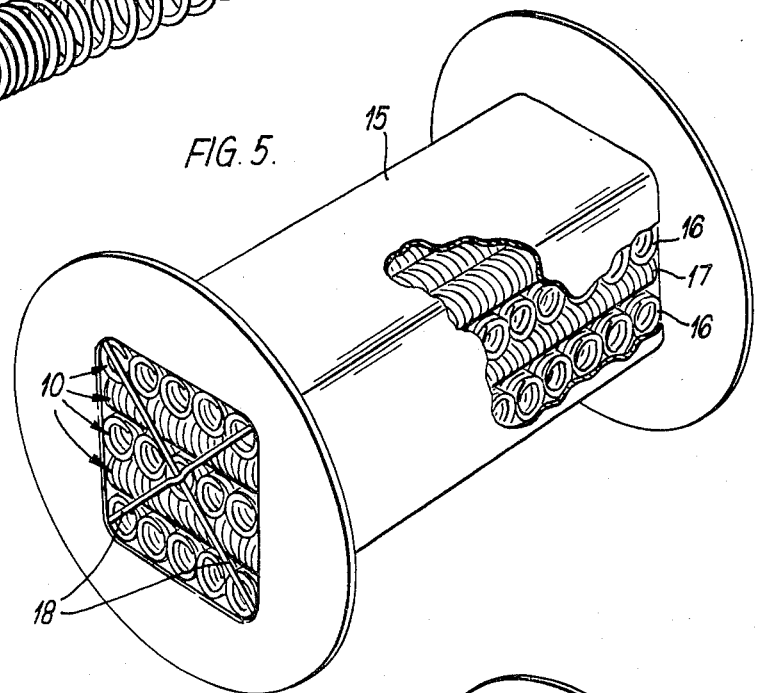
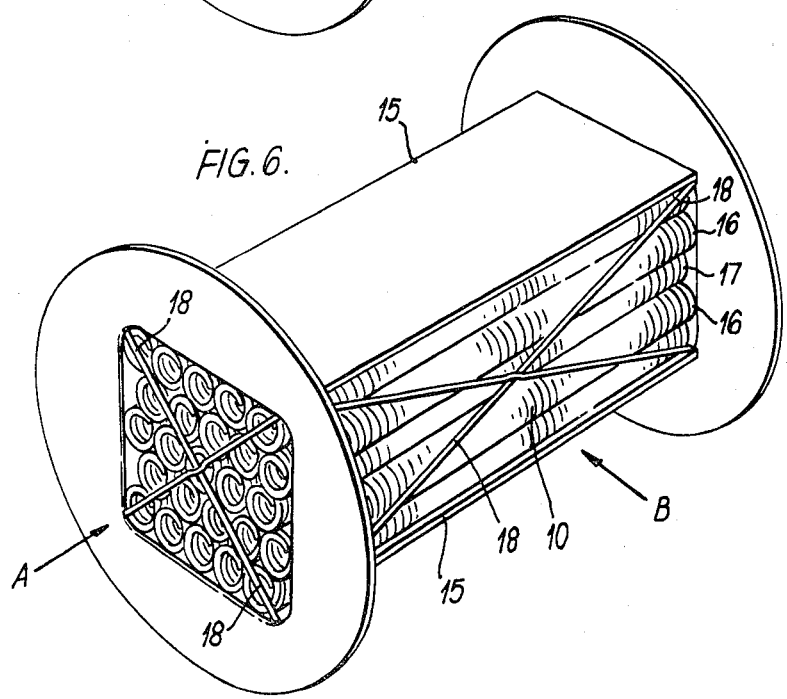

CATALYST SUPPORTS AND FLUID TREATMENT DEVICES

This is a continuation, of application Ser. No. 124,821 filed Feb. 26, 1980, and now abandoned, which in turn was a continuation of Application Ser. No. 916,561 filed June 19, 1978 and now abandoned.

The invention relates to catalyst devices and like devices for use in treatment of fluids by interaction with a solid surface. The invention is particularly concerned with catalyst devices for catalyst systems required to withstand a severe environment and repeated thermal cycling such as is met by a car exhaust treatment system.

British Patent Specification No. 1,472,138 describes a catalyst system comprising an alloy substrate, an electrically insualting ceramic layer on the surface of the alloy substrate, and a catalytic material supported on the ceramic layer, the alloy substrate comprising an alloy of iron with additions of chromium, aluminium and yttrium having the property of forming a substantially alumina surface layer on heating in air, said substantially alumina layer providing resistance to further oxidation attack and thereby protecting the alloy substrate, and the said electrically insulating ceramic layer comprising a substantially alumina layer formed by heating the alloy substrate in the presence of oxygen to cause the formation of the substantially alumina layer on the surface of the alloy substrate from aluminium from within the substrate, whereby the ceramic layer is tenaciously adherent to the alloy substrate.

The Specification No. 1,471,138 describes a substrate formed from the alloy into a cylindrical matrix which may be in the form of a wire bundle or may be formed from 0.0125 cm thick sheet corrugated and wound up, with an interleaved plain uncorrugated sheet, into a spiral.

The plain sheets serve to prevent the crests of the corrugation of one sheet nesting into the valleys of the corrugation of the next adjacent corrugated sheet. A catalyst is applied to the surface of the plain and corrugated sheets. It will be appreciated that of the total surface area of the sheets, only that surface area likely to be contacted by the gases to be treated is useful and that the portion of the surface area of the sheets in contact with other sheets cannot be usefully employed to support a catalyst. Up to 30% of the total surface area of the sheets can be lost this way and this results in having to increase the overall size of the catalyst support to obtain a given effective surface area. However, in some applications it is desirable to reduce total volume of catalyst support material present in a given volume of a catalyst device without reducing the total surface area available to support a catalyst. Also it is desirable to find a cheaper alternative way of fabricating the catalyst support rather than producing them from sheet or strip materials.

We have now found that the concepts underlying the invention of Specification No. 1,472,138 may be extended by selection and control of the configuration and surface coating of the substrate support.

Thus, if the substrate is fabricated in wire form in a particular open-work three dimensional configuration, defined more fully below, by which contact between adjacent wires or parts of wire is avoided at least until after surface coating has been carried out, and if the wire surface is smooth, and substantially free from discontinuity (except at the ends), as for example in a wire having circular cross-section, then a number of important advantages follows. In particular wide ranging adjustment of important parameters such as exposed surface area, resistance to fluid flow, mass and heat conducting properties of the substrate can be achieved without the constraint normally imposed by difficulties of coating a wire configuration substrate by contact with material dispersed in a liquid medium. Further, using a metallic substrate, a high degree of high temperature corrosion resistance can be achieved so that, for example, a substrate of aluminium bearing ferritic alloy without the yttrium addition can give satisfactory performance and durability in the severe environment of a motor vehicle exhaust system.

We have further appreciated that these advantages, whilst of principal significance in the manufacture and use of supported catalysts for satisfactory performance and durability in the catalystic purification of exhaust gases from motor vehicles, also have significance in any system (whether employing catalysis or not) where fluids are to be treated by passage over and interaction with a solid surface and control of the above mentioned parameters is important. Examples of other such systems where devices constructed in accordance with the present invention may be useful are in chromatographic separations, processes where the solid surface material has an affinity for a constituent of the fluid flowing over it and is employed to separate out that constituent from the fluid, and flame arrestors.

Accordingly, in one aspect the present invention provides a device for use in the treatment of a fluid by passing the fluid over a solid surface with which the fluid interacts, which device comprises a container having gas inlet and gas outlet passageways and assembled therein a plurality of components each of which is small compared with the size of the container and each of which comprises a substrate in wire form fabricated into an open-work three dimensional configuration in which contact between adjacent parts of the wire-form substrate is avoided, and a solid surface coating on the substrate of material for interacting with the fluid.

Preferably the wire-form substrate at the periphery of the open-work three dimensional confirugation defines open spaces of the periphery small enough in relation to the shape and diameter of wire-form substrate to avoid or limit penetration of one component into the internal open space of another component in the plurality of components assembled together.

It is preferred to fabricate the wire-form substrate in a helical configuration in which the space between adjacent windings is less than the diameter of the wire-form. The wire-form substrate may be fabricated in a helical configuration from corrugated wire-form substrate. Preferably the helical configuration is a helical coil with its windings extending progressively along a common axis. The corrugation may be superimposed along the length of the wire-form so that in each winding of the coil the space between adjacent parts of the wire-form substrate varies as a consequence of the corrugation. The pitch of the corrugation may be arranged in relation to the diameter of the coil and the pitch of the winding of the coil so that the peaks of the corrugation in each winding occur adjacent a peak in the next succeeding winding of the coil.

The preferred use of the device is in the treatment of a fluid by catalysis, in this case at least a surface of the, or each, component comprises a catalytically active material.

A plurality of the components may be assembled to form a fluid permeable body through which the fluid to be treated can flow in contact with the surfaces of the components. Preferably these components are distributed randomly in a container and are constrained within the container to form the fluid permeable body. Alternatively the, or each, component may be laid (folded or wound) on to itself, or on to other such components to form the fluid permeable body through which the fluid to be treated can flow in contact with the surface of the, or each, component.

Preferably the wire-form is made of an aluminium bearing iron based alloy (available in the U.K. under the U.K. Registered Trade Mark FECRALLOY). Such a metal alloy suitable for use in the present invention may be found within the alloy specification of a composition by weight of 10 to 30% Cr, 1 to 10% Al, 0 to 0.5% C, and the balance Fe.

Where resistance to high temperature embrittlement is important such alloys are made within the specification of a composition by weight of up to 20% Cr, 1 to 10% Al, 0.1 to 3.0% Y and the balance Fe. Where a degree of high temperature embrittlement can be tolerated, as for example where a helical coiled wire configuration is employed, higher chromium content up to 25% by weight may be employed. The particularly preferred composition is a FECRALLOY (Registered Trade Mark) alloy having 15.50 to 16.50% Cr, 4.6 to 5.6% Al, 0.3 to 1.0% Y and the balance Fe.

The above mentioned alloys may include additions of Co and/or Ni and it is envisaged that such inclusions should be limited to the range 0 to 3% by weight of each element. However, acceptable performabce may be achieved with these additions in the range 0 to 5% Co, and 0 to 5% Ni.

An alternative alloy is that sold under the U.K. Registered Trade Mark KANTHAL DSD. A typical example of such an alloy has an approximate composition by weight of 22.5% Cr, 4.5% Al, 2.0% Co, 0.1% C and the balance Fe.

Preferably the aluminium bearing alloy has a ceramic layer on its surface. Preferably the ceramic material is bonded to the surface of the wire-form by heat treatment. The ceramics may comprise alumina, ceria, yttria, refractory metal oxides, silicas including gel glasses. The preferred ceramic comprises alumina, which is bonded to the wire-form by heat treatment.

Preferably heat treatment, either before or after or both before and after coating with the porous ceramic, is carried out in the presence of oxygen to form a substantially alumina layer on the surface of the alloy wire from aluminium from within the alloy.

Catalytically active material may be deposited upon a plurality of components which are then assembled together to form a catalyst device. The catalytically active material may be deposited either after pre-coating of the substrate alloy with porous ceramic material or may be deposited simultaneously with the porous ceramic material.

There are many ways of applying the catalytic materials to a substrate such as, for example, sputtering techniques using gaseous discharge, plasma coating techniques, flame spraying techniques, wash coating techniques, vapour deposition techniques, and sintering techniques. The preferred way of depositing a catalyst onto the coiled member is that described in West German Offenlegungshrift No. 26 47 702.

According to a further aspect the invention provides a calalyst device for the treatment of a fluid by catalysis comprising a plurality of components in the form of a helically wound coil of wire-form assembled to form a fluid permeable body through which the fluid to be treated can flow in contact with the surfaces of the components, and at least a surface of each component comprises a catalytically active material. In this case the wire-form may be made of a catalytically active material.

In yet a further aspect the present invention provides a catalyst device for the treatment of a fluid by catalysis comprising at least one component in the form of a helically wound coil of wire-form laid on to itself, or on to other such components to form a fluid permeable body through which the fluid to be treated can flow in contact with the surfaces of the component, and at least a surface of each component comprises a catalytically active material. In this case the wire-form may be made of a catalytically active material.

Where there is a plurality of components, and a first catalytically active material may be applied to one or more of the components and one or more different catalytically active materials applied to one or more of the remaining components.

In a further aspect the invention provides a fluid treatment device comprising a container having fluid inlet and fluid outlet passageways, and in the container a plurality of discrete components the surfaces of which provide an interaction surface for fluid passed through the container, the discrete components each comprising open-work three dimensional configuration, the wire at the periphery defining upon spaces small enough in relation to the shape and diameter of wire at the periphery of other discrete components to avoid or limit the penetration of one component into the internal open spaces of another component by intertangling of another component therewith when two or more of the components are assembled together to form a fluid permeable body.

In yet a further aspect the invention provides a method of manufacturing a device for use in the treatment of a fluid by passing the fluid over a solid surface with which the fluid interacts, which method comprises fabricating one or more components comprising a substrate in wire form into an open-work three dimensional configuration in which contact between adjacent parts of the wire-form is avoided and coating the substrate with a solid surface of material for interacting with the fluid.

In yet a further aspect the invention provides a method of manufacturing a device for use in the treatment of a fluid by passing a fluid over a solid surface with which the fluid interacts, which method comprises the steps of fabricating at least one component comprising a substrate in wire-form fabricated into an open-work three dimensional configuration, and assembling the conponent or components into a fluid permeable body through which the fluid to be treated can flow in contact with the surface of the component or components.

Preferably the step of providing the coating on the surface of the substrate comprises contacting the substrate with a dispersion containing the catalytically active material or a precursor therefor, thereby to coat the wire-form with the dispersion, ensuring that the whole extent of the surface of the substrate to be coated is contacted by the dispersion, and heat treating to provide the substrate with a coating containing the catalytically active material.

The preferred method of coating a plurality of discrete components comprises contacting them as a batch with a dispersion of coating material in a liquid medium, removing the batch from contact with the liquid dispersion, removing excess liquid by shaking which causes relative movement between the discrete components and thereby frees excess liquid trapped by surface tension effect at points of contact between adjacent components, and drying.

In a further aspect the invention makes possible a method of treating a fluid by catalysis comprising the steps of: flowing the fluid through a catalyst device which comprises at least one component in wire-form fabricated into an open-work three dimensional configuration assembled to define a fluid permeable body through which the fluid can flow in contact with the surfaces of the, or each, component, the, or each, component being constructed so that adjacent parts of the substrate of each component does not contact adjacent parts of the substrate of the same component, and the surface of each substrate being provided with a catalytically active material; and causing the fluid to contact the catalytically active material for a time sufficient to effect a catalytic reaction in the fluid.

In a further aspect the invention makes possible a method of treating the exhaust gases of an internal combustion engine by catalysis comprising the step of flowing the exhaust gases through a catalyst device which comprises a substantially non-interlocking array of open-work three dimensional configurations that define a fluid permeable structure through which the exhaust gases may flow in contact with the surfaces of the three dimensional configurations, each of the three dimensional configurations being made from an aluminium bearing iron based alloy which has on its surface one or more catalytically active materials suitable for the catalytic reduction of nitrogen oxides, the catalytic oxidation of hydrocarbons and the catalytic reduction of carbon monoxide in the exhaust gases.

In accordance with the invention, a device for use in the treatment of a fluid by catalysis generally comprises a container, a fluid inlet passageway to the container, a fluid outlet passageway from the container, a plurality of discrete metal components randomly assembled in the container, each of which components is in wire form and has an open-work three dimensional configuration, the wire at the periphery of the configuration of at least most of the components defining open spaces small enough in relation to the shape and diameter of wire at the periphery of other components to at least limit the penetration by intertangling therewith of one component into the internal open spaces of another component, at least a substantial number of the components being unrestrained from intertangling but for prevention thereof by the intrinsic configurational properties of the components, and a solid surface coating on the components comprising catalytically active material for the catalysis of a reaction involving the fluid.

Also in accordance with the invention, a device for use in the treatment of a fluid by passing the fluid over a solid surface with which the fluid interacts comprises a container, a fluid inlet passageway to the container, a fluid outlet passageway from the container, a plurality of discrete components assembled in the container, each of which components is in wire form and has an open-work three dimensional configuration, the wire at the periphery of the configuration of at least most of the components defining open spaces small enough in relation to the shape and diameter of wire at the periphery of other components to at least limit the penetration by intertangling therewith of one component into the internal open spaces of another component, at least a substantial number of the components being unrestrained from intertangling but for prevention thereof by the intrinsic configurational properties of the components, and a solid surface coating on the components for interaction with the fluid.

Also in accordance with the invention, a device for use in the treatment of a fluid by passing the fluid over a solid surface comprises at least one component in the form of a helically wound coil of wire-form laid onto itself, or onto other such components, to form a fluid permeable body through which the fluid to be treated can flow in contact with the surfaces of the component or components, the wire at the periphery of part of any such coil defining open spaces small enough in relation to the shape and container of wire at the periphery of another part of that coil or at the periphery of other coils, if present, to at least limit penetration, by intertangling therewith, of part of one component into the internal open spaces of another part of the same component or of one component into the internal open spaces of another component, and a surface coating on the components comprising catalytically active material, at least parts of such components being unrestrained from intertangling with other parts of the same component or with other components, if present, but for prevention thereof by the intrinsic configurational properties of such component or components.

Further in accordance with the invention, a method of manufacturing a device for use in treatment of a fluid by passing fluid over a solid surface with which the fluid interacts comprises fabricating one or more components in wire-form into an open-work three-dimensional configuration, contacting the component or components with a dispersion convertible on subsequent drying and firing into a ceramic, removing excess liquid under conditions in which contacts between adjacent wires or parts of the wire are avoided or separated, drying and firing the component or components to provide a surface layer of ceramic material on the wire, and assembling the component or components into the device for use in treatment of a fluid such that, in the device, the wire at the periphery of part of the component or at least some of the components defining open spaces small enough in relation to the shape and diameter of wire at the periphery of another part of that component or at the periphery of other components, if present, to avoid penetration, by intertangling therewith, of part of one component into the internal open spaces of another part of the same component or of one component into the internal open spaces of another component, at least parts of the component or at least some of the components being unrestrained from intertangling with another part of the same component or with other components but for prevention thereof by the intrinsic configurational properties of such component or components.

Embodiments of the present invention will now be described, by way of example, with reference to the accompanying drawings in which FIGS. 1, 2 and 4 illustrate three components for use in a catalyst device constructed in accordance with the present invention.

FIGS. 5 and 6 illustrate two catalyst devices made from a number of components of the type shown in FIGS. 1, 2 or 4, arranged relative to one another to define a body through which a fluid to be treated can flow.

In the following embodiments of the invention the final product is to be used for the treatment of the exhaust gases of internal combustion engines by catalysis. It is to be understood however that the catalyst devices of the present invention may be useful in other industrial processes requiring supported catalytically active material.

Figure 1:
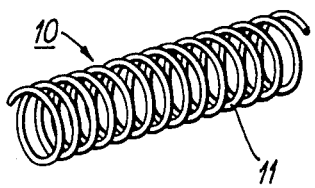

Referring to FIG. 1, there is shown a component comprising a helical coil 10 made from a 0.040 ins (1.0 mm) diameter circular section wire 11 wound along an axis to form a coil which measures 3.0 ins (76.2 mm) long×0.25 ins (6.4 mm) outside diameter. The pitch of the windings is approximately 0.039 ins (1.0 mm).

The wire is made of FECRALLOY alloy (U.K. Registered Trade Mark) having a composition (by weight) of 4.6 to 5.6% Al, 15.50 to 16.50% Cr, 0.3 to 1.0% Y, and the balance Fe. A predominantly alumina layer is formed on the surface of the wire and a catalyst is deposited on the alumina layer as described in West German Offenlegungschrift No. 26 47 702. In a particular example suitable for use in manufacturing catalyst devices of the present invention, alumina, prepared by a vapour condensation method, is formed into a sol by admixture with water and the sol mixed with a solution of yttrium nitrate in water to form a "mixed sol". A platinum salt is added to the mixed sol to constitute a dispersion which is applied to a preoxidised Fecralloy alloy substrate. The thus coated substrate is subsequently fired to provide a coating containing platinum as the catalytically active material. Other techniques of applying a catalyst to the coil 10 may be used.

Figure 2:
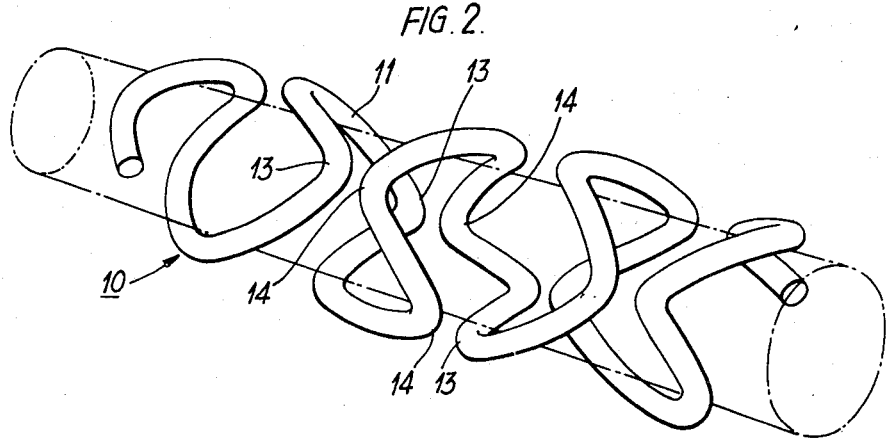
Figure 3:
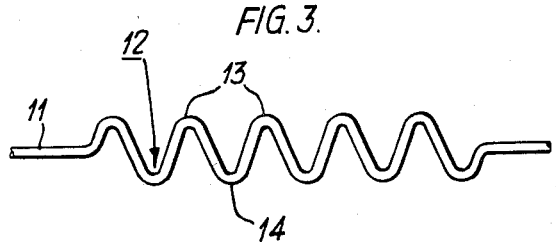
FIG. 3 illustrates the wire-form used to produce the components of FIG. 2.

Referring to FIG. 2 there is shown an alternative form of coiled wire-form manufactured from the same type of alloy wire 0.02 ins (0.5 mm) diameter and wound into a coil 0.125 ins (3.0 mm) diameter by 1.5 ins (40 mm) long with a pitch of 0.11 ins (2.8 mm). The wire, used to make the coil 10 of FIG. 2 is shown in FIG. 3. From FIG. 3 it will be seen that the wire 11 has superimposed along its length a corrugation 12 prior to it being wound into a coil. The corrugation 12 has a pitch of typically 0.13 ins (3.5 mm) and the dimension measured from peak to peak 14 is typically 0.04 (1.0 mm). The corrugations 12 imparts strength to the thin wire 11 and also if the peak 13, 14 of the corrugation 12 of each winding are arranged to coincide with peaks 13, or 14 in the next adjacent winding serve to prevent nesting of adjacent coiled members. Here again a surface coating and a catalytically active material is applied to the wire 11 in exactly the same way as described in connection with FIG. 1.

The components shown in FIGS. 1 and 2 may be of uniform pitch as shown in FIGS. 1 and 2 or the pitch may vary along the length of the coil as shown in FIG. 3. In the case of the component shown in FIG. 2, the pitch of the corrugations may be altered so that the peaks 13, 14 of each winding coincide.

Referring to FIGS. 5 and 6, a number of coils 10 of type shown in FIGS. 1 to 4 are assembled into a suitable holder 15 to form different catalyst devices. For example, in FIG. 5 a number of layers 16,17 of coils 10 are employed. The longitudinal axis of each coil 10 in each layer 16, 17 extend in a common direction, but each layer 16 is arranged relative to adjacent layers 17 so that the longitudinal axes of the coils 10 of each layer 16 are at an angle to the longitudinal axes of the coils 10 in adjacent layers 17. Wires 18 are used to prevent the coils falling out of the holder 15.

In FIG. 6, all the coils 10 are assembled into a holder 15 with their longitudinal axes extending in a common direction. The cross-sectional shape of the holder 15 may be rectangular (as shown) or circular, eliptical or any other shape that will accommodate the coils 10. The fluid to be treated is arranged to flow in a direction substantially parallel to the longitudinal axes of the coils 10 (arrow A) as shown. Alternatively, a different holder 15 may be used that allows the fluid to be treated to flow normal to the longitudinal axes of the coils 10.

Wires 18 are employed to retain the bundle of coils 10 in the holder 15 in the catalyst device of FIGS. 5 and 6.

If desired, instead of laying up a plurality of coils 10 to form the catalyst device shown in FIGS. 5 or 6, one or more long lengths of coil, of the type shown in FIGS. 1, 2 or 4 may be folded onto itself to produce a similar layered effect.

Figure 7:
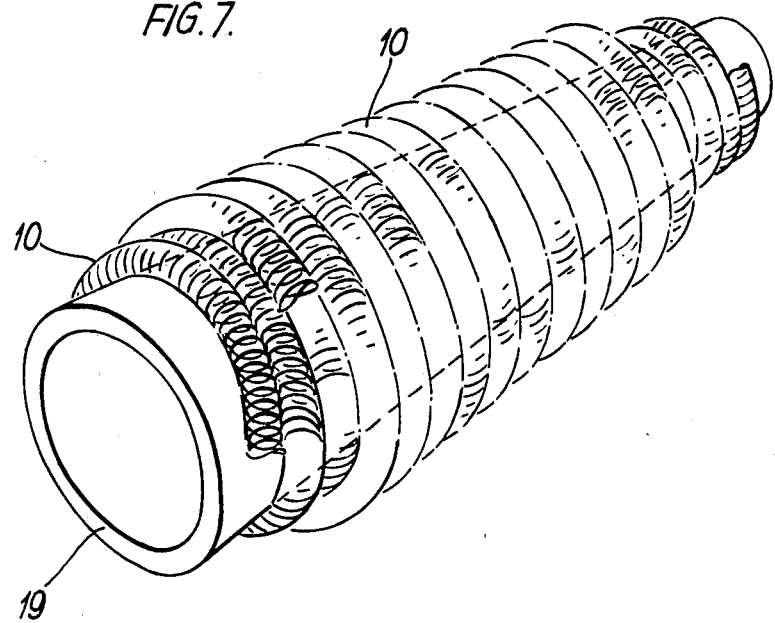
FIGS. 7 and 8 illustrate two further forms of catalyst device made from a single component similar to that shown in FIGS. 1, 2 or 4.
Figure 8:
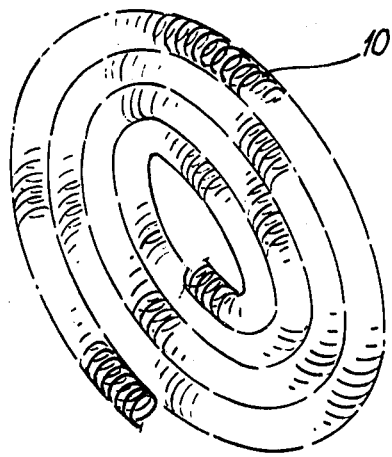

A continuous length of coiled wire such as illustrated in any one of FIGS. 1, 2 or 4 may be wound on itself to form a catalyst device. Two examples of such a device are shown in FIGS. 7 and 8. The catalyst device of FIG. 7 is formed by winding the coiled member 10 onto a spool or former 19 to produce one or more layers. The catalyst device of FIG. 8 is formed by winding the coiled member 10 into a spiral form. A number of spirally wound layers may be stacked side-by-side to form a complete catalyst system.

Instead of assembling a plurality of coils 10 of the type shown in FIGS. 1, 2 and 4 in an ordered fashion as shown in FIGS. 5 and 6. The coils may be poured randomly into a container. Specifically, Fecralloy alloy wire 0.010 ins (0.25 mm) diameter is wound into a coil of overall diameter 0.107 ins. (2.7 mm) and of a continuous length. The coil so formed is then chopped to produce coils having a length of 0.25 ins (6.4 mm) and a plurality of the coils are poured into an open ended container, or ducting, having a fine mesh at one end. The container, or ducting may be of any shape. The container may be shaken to ensure that the coils settle in the container and form a fluid permeable body and when the container is filled with the chopped coils a second wire mesh is provided to retain the coils in the container. In operation the exhaust gases to be treated are caused to flow through the fluid-permeable body so formed.

Preferably the coils 10 of the catalyst devices of FIGS. 5 to 8, have a surface coating and a catalyst applied to them prior to assembly into the holder 15. In some cases it may be possible to coat them after they are assembled in the holder 15.

The diameter of the wire 11 and size of the coils 10 (i.e. length, diameter and pitch of the coil) may be varied to suit any particular process. In particular, these parameters can be varied to meet desired pressure-drop specifications for the intended use of the catalyst device. By varying these parameters one effectively varies the total effective surface area available to support a catalyst.

Preferably the cross-sectional shapes of the bore of the coils is a circle, although it may be of any desired shape, such as for example, triangular, rectangular, or polygonal achieved by winding the wire-form helically along a suitably shaped former. The terms "helical" and "helically" as used herein is taken to embrace coils wound along an axis irrespective of the shape of the bore of the coil. The coils may be formed on a conventional spring winding machine. The coils may be of uniform diameter or tapered if desired.

It is preferred to make the wire-form of a metal, for example steels, refractory metal carbides, WC, TiC, TaC, stainless steels and stainless irons. The wire-form may be drawn wire or an extruded rod.

It may be possible in some instances to use a ceramic filamentary member, although it is thought that such a route of manufacture would not be as easy as producing the components from metal wire, because of the need to fabricate the components in a green (plastic) state and then fire them to produce the final form.

Catalyst devices constructed according to the present invention are useful in the treatment of exhaust gases of internal combustion engines by catalysis and in particular for trapping and treating soot products in the exhaust gases of diesel engines by catalysis, and the catalytic reduction of nitrogen oxides and catalytic oxidation of hydrocarbons and carbon monoxide in engine exhaust gases.

An important advantage that results from making the catalyst devices in the form of a number of coils in accordance with the present invention is that one can apply different catalytically active materials to different coils if one so desires. For example, one can construct a composite catalyst device using two or more sets of identical coils assembled to form a body with different catalytically active materials deposited on each set of coils. For example a catalyst device similar to that shown in any of FIGS. 5 to 8 may be constructed with some of the coils carrying one metal from the platinum group of metals (platinum, osmium, irridium, palladium, rhodium, ruthenium) whilst the others carry a different metal from the platinum group.

In a specific example, a catalyst device constructed in accordance with the present invention for the treatment of exhaust gases of an internal combustion engine by catalysis may have some coils coated with platinum and the others coated with rhodium. In the past it has been usual to put down the platinum and rhodium as a common coating with platinum sites closely adjacent the rhodium sites. We have observed that after prolonged use the platinum becomes less effective at catalysing the oxidation of the hydrocarbons. Examination of the surface of the catalyst reveals that active platinum sites are lost, but we have found that this loss does not occur to the same extent when the rhodium and platinum are deposited on separate coils.

Tests involving the oxidation of propane were carried out by flowing a slug of propane/oxygen carried in a nitrogen stream over two types of supported catalyst. One supported catalyst was a Pt/Rh mixed catalyst on a ceramic coated FECRALLOY alloy substrate (shown as Catalyst A below), the other comprised separate Pt and Rh catalysts on separate coiled members made of ceramic coated FECRALLOY alloy assembled to constitute a common catalyst (shown as Catalyst B below).

The catalyst volume was displaced 100,000 times per hour by the propane/oxygen slug. The results are shown below.

| Type of supported catalyst (see text) | Temperature required for 100% oxidation of propane | |
|---|---|---|
| | New catalyst | Catalyst after heating in air at 1,000° C. for 12 hours |
| A | 350° C. | 500° C. |
| B | 400° C. | 400° C. |

It is thought that the problem of the deterioration of the efficiency of the platinum as a catalyst may also apply to the commercial production of nitric acid from ammonia where platinum and rhodium are used as the catalysts. Therefore a catalyst bed made up of two sets of coils, each set of which either carries platinum or rhodium may be useful in the production of nitric acid.

The present invention may of course be useful in a wide variety of chemical processes involving treatment of fluids by interaction with a solid surface.

We claim:

1. A device for use in the treatment of a fluid by catalysis which device comprises
    a container;
    a fluid inlet passageway to the container;
    a fluid outlet passageway from the container;
    a plurality of discrete metal components randomly assembled in the container, each of which components is in wire-form and has an open-work three dimensional configuration, the wire at the periphery of the configuration of at least most of the components defining open spaces small enough in relation to the shape and diameter of wire at the periphery of other components to at least limit the penetration by intertangling therewith of one component into the internal open spaces of another component, at least a substantial number of the components being unrestrained from intertangling but for prevention thereof by said intrinsic configurational properties of the components; and
    a solid surface coating on the components comprising catalytically active material for the catalysis of a reaction involving the fluid.

2. A device for use in the treatment of a fluid by passing the fluid over a solid surface with which the fluid interacts, which device comprises
    a container;
    a fluid inlet passageway to the container;
    a fluid outlet passageway from the container;
    a plurality of discrete components assembled in the container, each of which components is in wire-form and has an open-work three dimensional configuration, the wire at the periphery of the configuration of at least most of the components defining open spaces small enough in relation to the shape and diameter of wire at the periphery of other components to at least limit the penetration by intertangling therewith of one component into the internal open spaces of another component, at least a substantial number of the components being unrestrained from intertangling but for prevention thereof by said intrinsic configurational properties of the components; and
    a solid surface coating on the components for interaction with the fluid.

3. A device according to claim 2 wherein, in each component, contact between adjacent parts of the wire-form is avoided.

4. A device according to claim 2 wherein each component has a helical configuration in which the space between adjacent windings is less than the diameter of the wire-form.

5. A device according to claim 2 wherein each component is fabricated in a helical configuration from a corrugated wire-form, whereby in each turn of the helical configuration the space between adjacent parts of the wire-form varies as a consequence of the corrugation.

6. A device according to claim 2 wherein the components are randomly distributed in the container.

7. A device according to claim 4 wherein a corrugation is superimposed along the length of each wire-form.

8. A device according to claim 7 wherein the pitch of the corrugation is arranged in relation to the diameter of the helical configuration and the pitch of the winding of the helical configuration so that the peaks of the corrugation in each winding occur adjacent a peak in the next succeeding winding of the helical configuration.

9. A device according to claim 2 wherein each component is of metal.

10. A device according to claim 9 wherein the metal is an aluminium bearing iron base alloy.

11. A device according to claim 10 wherein the alloy carries, constituting the solid surface coating, a ceramic layer which in turn carries a catalytically active material.

12. A device according to claim 2 wherein the solid surface coating comprises a catalytically active material.

13. A device for use in the treatment of a fluid by passing the fluid over a solid surface, which device comprises at least one component in the form of a helically wound coil of wire-form laid onto itself, or onto other such components, to form a fluid permeable body through which the fluid to be treated can flow in contact with the surfaces of the component or components, the wire at the periphery of part of any such coil defining open spaces small enough in relation to the shape and diameter of wire at the periphery of another part of that coil or at the periphery of other coils, if present, to at least limit penetration, by intertangling therewith, of part of one component into the internal open spaces of said another part of the same component or of one component into the internal open spaces of another component; and a surface coating on the components comprising catalytically active material, at least parts of such component being unrestrained from intertangling with another part of the same component or with other components, if present, but for prevention thereof by said intrinsic configurational properties of such component or components.

14. A device according to claim 13 wherein, in the or each component, contact between adjacent parts of the wire-form is avoided.

15. A device according to claim 13 wherein the or each component is of metal.

16. A device according to claim 15 wherein the metal is an aluminium bearing iron base alloy.

17. A method of manufacturing a device for use in treatment of a fluid by passing fluid over a solid surface with which the fluid interacts, which method comprises fabricating one or more components in wire-form into an open-work three-dimensional configuration;

contacting the component or components with a dispersion convertible on subsequent drying and firing into a ceramic;

removing excess liquid under conditions in which contacts between adjacent wires or parts of the wire are avoided or separated;

drying and firing the component or components to provide a surface layer of ceramic material on the wire; and assembling the component or components into the device for use in treatment of a fluid such that, in the device, the wire at the periphery of part of the component or at least some of the components defining open spaces small enough in relation to the shape and diameter of wire at the periphery of another part of that component or at the periphery of other components, if present, to avoid penetration, by intertangling therewith, of part of one component into the internal open spaces of said another part of the same component or of one component into the internal open spaces of another component, at least parts of the component or at least some of the components being unrestrained from intertangling with another part of the same component or with other components but for prevention thereof by said intrinsic configurational properties of such component or components.

18. A method according to claim 17 wherein catalytically active material is deposited upon the or each component.

* * * * *